United States Patent
Hofmann et al.

[11] 3,806,062
[45] Apr. 23, 1974

[54] PASSIVE EDDY CURRENT NUTATION DAMPER

[75] Inventors: Gideon Hofmann, Pasadena;
Spencer D. Howe, Los Angeles;
Anthony J. Iorillo, Pacific Palisades;
Gordon S. Reiter, Marina Del Rey;
Charles P. Rubin, Los Angeles, all of Calif.

[73] Assignee: Hughes Aircraft Company, Culver City, Calif.

[22] Filed: Apr. 29, 1970

[21] Appl. No.: 33,028

[52] U.S. Cl. .................. 244/1 SA, 74/5.5, 188/1 B, 310/93
[51] Int. Cl. ............................................. B64g 1/00
[58] Field of Search ............ 244/1 SS; 310/93, 105; 35/12 C; 74/5.5

[56] References Cited
UNITED STATES PATENTS

| | | |
|---|---|---|
| 3,249,321 | 5/1966 | Newkirk et al. .................. 244/1 |
| 3,363,856 | 1/1968 | Tossman et al. .................. 244/1 |
| 3,442,468 | 5/1969 | Torillo .................. 244/1 |
| 3,510,705 | 5/1970 | O'Neill et al. .................. 310/93 |

*Primary Examiner*—Milton Buchler
*Assistant Examiner*—Jeffrey L. Forman
*Attorney, Agent, or Firm*—James K. Haskell; Lewis B. Sternfels; W. H. McAllister

[57] ABSTRACT

Nutation in a spin stabilized device is damped through the energy absorbing medium of eddy current dissipation as a permanent magnet moves with respect to a non-magnetic conductive plate. Because the nutational frequencies of the device can be determined, the damping effected by movement of the permanent magnet may be made more effective by tuning the damper to the nutational frequencies by use of a spring mechanism acting on the magnet. Nutations of the device will be damped so long as the effective damper mass of the magnet is located away from the center of gravity or center of mass of the total vehicle.

12 Claims, 7 Drawing Figures

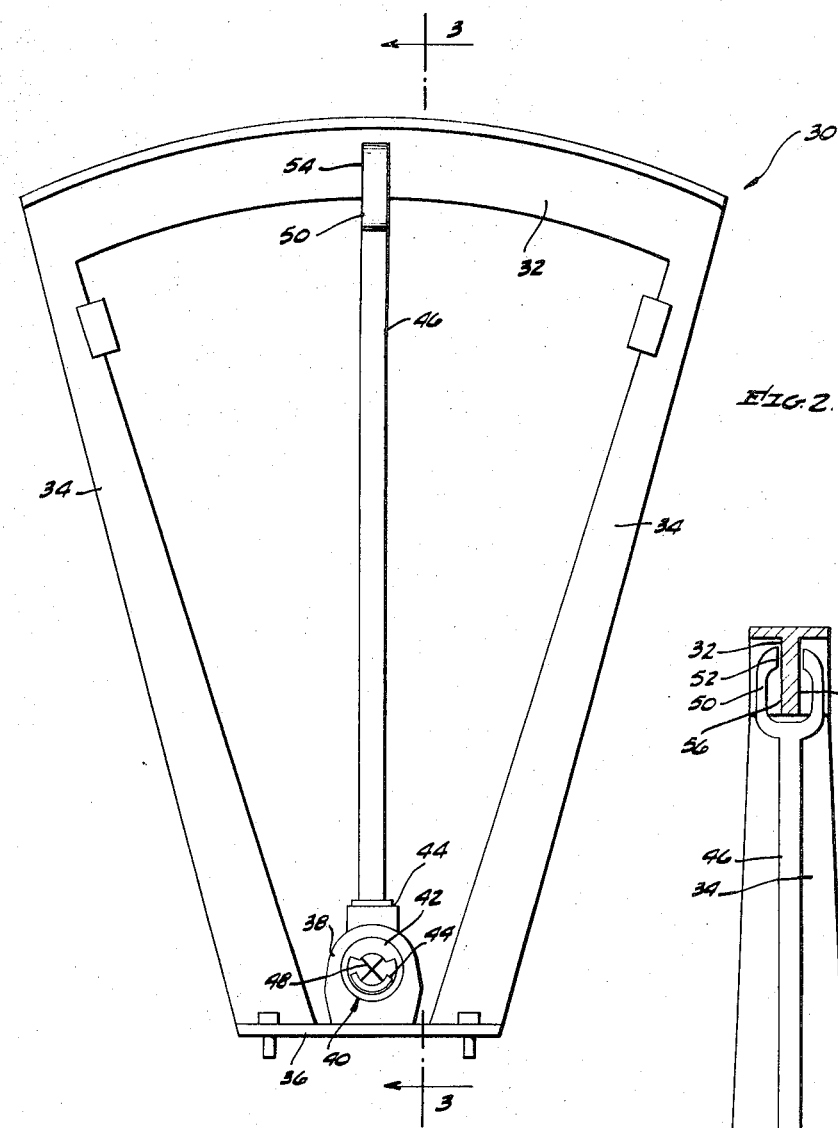
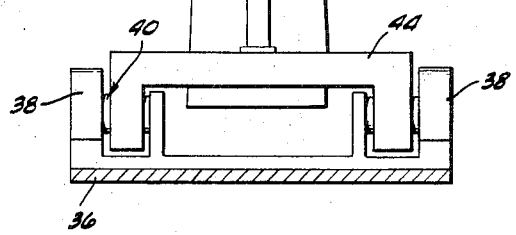
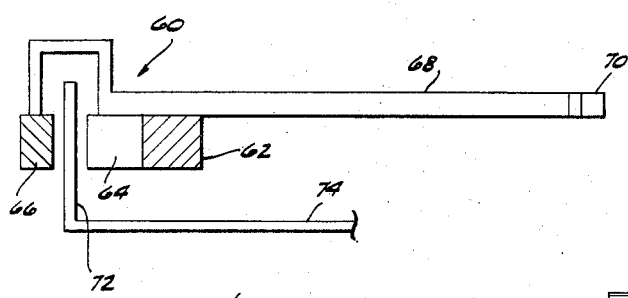

PASSIVE EDDY CURRENT NUTATION DAMPER

The present invention relates to an eddy current nutation damper and, to such a damper which is passive and which is particularly useful for damping out nutations in spin stabilized devices or vehicles whose inertia ratio is less than or equal to one, that is, the inertia of the device about its spin axis is less than or equal to its inertia about an axis transverse to the spin axis; however, the present invention can also be applied to vehicles whose inertia is greater than one. In either case, the damping mechanism must be located on an element which is despun or counterspun relative to the spinning element of the device.

These devices or vehicles can be utilized in a variety of applications, such as in the laboratory and in the field. As a laboratory instrument, these devices or vehicles are useful as environmental test beds for duplicating desired modes of environmental operations such as testing or proving instrumentation performance, spin stability, attitude control, and the like. In the field, such as in outer space, such vehicles or devices can be utilized as scientific devices for obtaining and communicating information of physical conditions, etc., and as communication links.

For such devices or vehicles, having an inertia ratio of less than or equal to one, nutational stability can be achieved only by the use of a damper which is despun, as fully explained in U.S. Pat. No. 3,442,468. For other devices having an inertia ratio of greater than one, either a spinning or despun damper may be used to enhance the stability characteristics. The dampers that have been heretofore used to provide the energy dissipation for damping nutation may be classified in at least two categories depending on whether they can or cannot be tuned to the particular frequency or frequencies at which the nutation occurs.

Tuned dampers generally are more efficient than the untuned type and are lighter in weight, which is especially important when such devices or vehicles are intended for space applications. One such tuned damper is the pendulum-type damper which produces viscous damping by the induced motion of a bob suspended in a fluid by an appropriately stiff wire to provide the desired natural frequency. Such a damper has several drawbacks. The fluid must be enclosed in a sealed container which adds weight and extra material not required for the specific purpose or use of the gyroscopic body. When there are temperature variations, the field undergoes thermal expansion which must be compensated for by such means as bellows, which add cost and complexity to the damping system. Furthermore, the damper must be located at such positions on the device or vehicle which are thermally controlled in order to avoid appreciable degradation in the performance due to the change in fluid viscosity resulting from such temperature variations.

Two dampers of the untuned type are the mercury damper and the impact damper. The former has mercury circulating in a closed circuit tube which may or may not be completely filled therewith. Energy is dissipated by the flow of mercury in the tube. The impact damper utilizes balls which are free to move inside the tube. The forced motion of the tube due to nutation causes energy to be dissipated upon inpact of the balls with the end of the tube or, during their travel prior to impact, upon viscous interaction between the balls and the fluid medium contained in the tube. These dampers are primarily disadvantageous in that they cannot be tuned to the nutation frequency or frequencies and, thus, their ability to dampen nutation is reduced.

These prior art dampers have the advantage, however, of operating in a passive manner in that they do not require a sensor and power source. This advantage is especially important for field operation of the device or vehicle where an external source of power may not be available or in large supply.

The present invention overcomes these and other disadvantages yet incorporates the advantages of a passive nutation damper. Briefly, the present invention comprises a permanent magnet moveable with respect to a plate, which is capable of supporting the generation of eddy currents, and a spring mechanism secured between the magnet and the device on which the magnet is pivoted. The plate is affixed to the device.

When the device nutates as a gyroscopic body, the permanent magnet is caused to oscillate harmonically relative to the conductive plate. Transversal of the magnet across the plate generates eddy currents therein and the energy created thereby is dissipated because of the electrical resistance in the plate in accordance with the square of the current multiplied by the resistance and as more fully described hereinafter.

In one embodiment, the magnet is pivotable about a single axis. The poles of the magnet may be disposed on either side of the plate and as close thereto as possible without touching the plate or, alternatively, the poles may be placed on one side of the plate with a piece of magnetic material on the other side thereof to complete the magnetic flux path.

In a second embodiment, the plate is configured as a dish whose curvature is designed in such a manner that the magnet may move with two degrees of motion with a similar curvature as that of the plate so as to provide minimum spacing between the magnet poles and the plate. In both embodiments, the mass of the magnet and attached structure and the magnitude of the spring rate of the spring mechanism are so selected as to appropriately tune the damper to the nutational frequency of the spinning body. When the nutational frequency varies over the life of the vehicle, such as from fuel consumption, thus creating a band of nutational frequencies over the service life of the vehicle, the energy is said to be time dependent and the requirements for internal energy dissipation accordingly varies. In such a case, the present invention is tuned at a frequency within this band of frequencies.

It is, therefore, an object of the present invention to provide a simple nutation damper.

Another object is the provision of a passive nutation damper.

Another object is to provide such a damper which is relatively insensitive to temperature variation without the need of thermal control therefor.

Another object is the provision of such a damper which is low in weight and which does not require an enclosure.

Another object is to provide such a damper which is positionable at any desired location of the spinning body except at the center of gravity or mass.

Another object is the provision of such a damper which not only will withstand and damp out large nutation angles but also will damp out exceedingly small nutations.

Other aims and objects as well as a more complete understanding of the present invention will appear from the following explanation of exemplary embodiments and the accompanying drawings thereof. In this explanation, reference is made to a particular dual spin device such as that described in the afore-mentioned U.S. Pat. No. 3,442,468, entitled "Nutation Damped Stabilized Device", assigned to the assignee of the present invention; however, it is to be understood that other dual spin devices, as well as single spin devices having an inertia ratio of less than one, may be damped, or have stabilization enhanced, by the present invention. Accordingly, FIG. 1 is a schematic view of a dual spin axisymmetric system provided with the eddy current damper of the present invention;

FIG. 2 is a side view of a single axis embodiment of the present invention;

FIG. 3 is an end view of the embodiment depicted in FIG. 2 taken along lines 3—3 thereof;

FIG. 4 is an end view of a second embodiment of a single axis damper;

Figure 1:
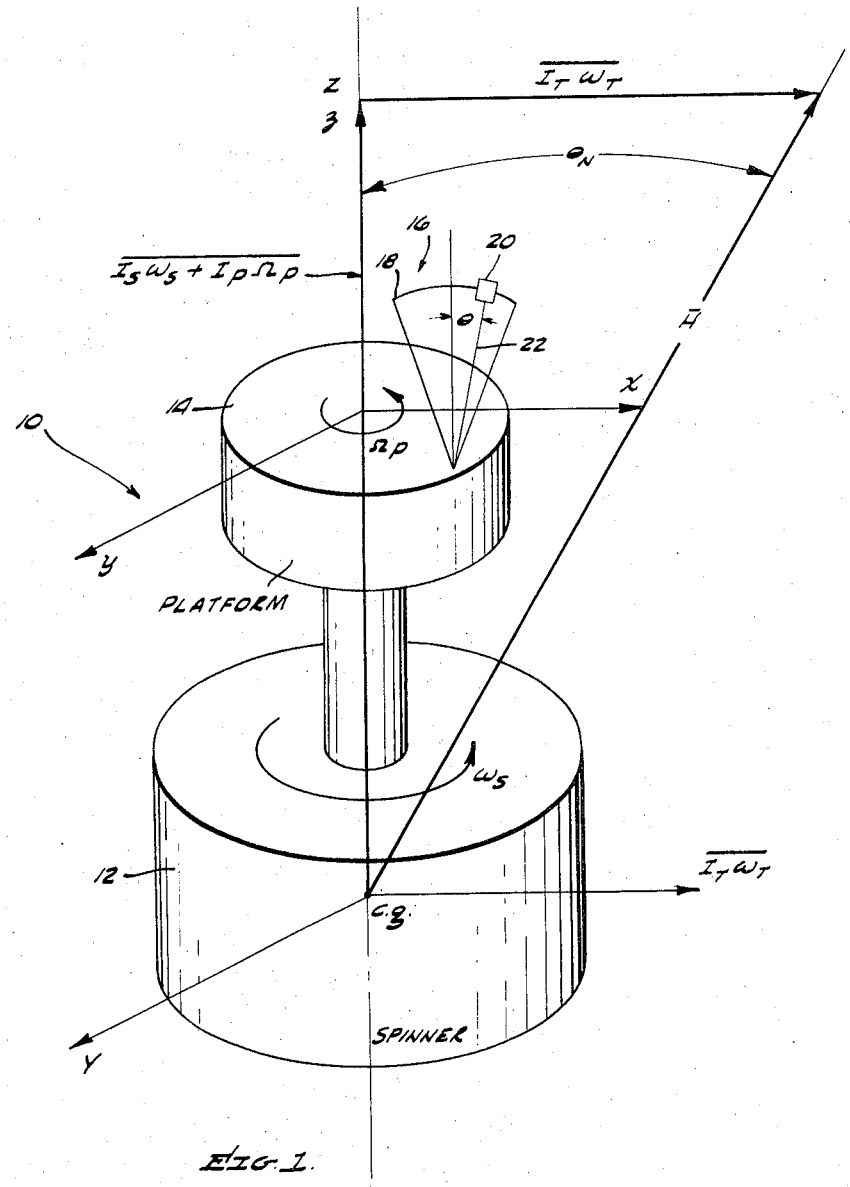

Referring to FIG. 1, a dual spin device 10 comprises a gyroscopic spinning element or spinner 12 with a despun element or platform 14, mechanically coupled thereto, that is, spinner 12 rotates at an angular velocity $\omega_s$ while platform 14 rotates or moves with respect to inertial space at another angular velocity $\Omega_p$. The mechanical coupling between the two elements is not illustrated as such is known in the art. Although the angular velocity of the platform is shown to be in the same direction as that of spinner 12, the angular velocity $\Omega_p$ may be equal but opposite to angular velocity $\omega_s$ so that the platform will appear stationary to an observer at some reference point. The center of gravity or mass of the entire dual spin device is indicated by the point c.g. A damper 16 of the single axis type is secured to platform 14 and comprises a plate 18 immoveably fixed to the platform, and an electromagnet 20 pivotably secured to platform 14 by a pivot arm 22. Damper 16 and its elements are more fully described hereinafter.

Platform 14 of dual spin device 10 provides a convenient setting on which communication, observation, testing, etc., operations may be performed or simply a despun element for support of damper 16.

Attitude stability of such dual spin devices in the absence of external torques is most easily achieved by spinning the vehicle. The conservation of angular momentum insures that the vehicle attitude will remain fixed with respect to a desired reference space. When the single spinning body contains non-rigid, energy dissipative elements, stabilization problems occur. Stability in such cases may be related to the inertia ratio of the body, $k$, which is defined as the ratio of the moment of inertia of the body about the spin axis, $I_s$, to the moment of inertia, $I_T$, about an axis perpendicular to the spin axis, that is, $k = I_s/I_t$. For $k \leq 1$, device 10 is inherently unstable in the absence of a despun damper with adequate nutation energy dissipation characteristics.

For $k > 1$, a spin stabilized device is inherently stable; however, the use of a despun damper will enhance its stability characteristics. The passive eddy current damper of the present invention is utilized to achieve stability for both $k \leq 1$ and $k > 1$. Stability of devices having an inertia ratio less than or equal to one is achieved in a manner discussed in the above-mentioned U.S. Pat. No. 3,442,468.

Referring now to FIGS. 2 and 3, an eddy current damper 30 comprises a plate 32, such as aluminum, copper, and silver, which is capable of carrying an electric current, that is, which has the ability to support generation of eddy currents. Plate 32 is secured to a device or vehicle on a supporting element such as platform 14 by means of a pair of arms 34 and a support 36. Also secured to the device and to support 36 is a pivot support 38 for carrying a flexure pivot 40 having one portion 42 which is connected to support 38 and a second portion 44 which is secured to a pivot arm 46. Flexible members 48 interconnect portions 42 and 44 to provide a single degree of movement under a spring bias of arm 46. Although depicted as a particular flexure pivot, having a cross-spring construction, pivot 40 may comprise any convenient spring biased mechanism, such as a torsion wire or a pivot with attached spring or a simple leaf spring. Secured to arm 46 is a permanent magnet 50 having a pair of pole faces 52 and 54 which are placed on opposite sides 56 and 58 of plates 32. Therefore, when arm 46 and magnet 50 oscillate by means of flexure pivot 40, magnet 50 moves with respect to plate 32 in order to generate eddy currents therein and to damp the motion causing the oscillation as more fully described below.

FIG. 4 depicts an alternate arrangement 60 of a magnet moveable with respect to a current carrying, non-magnetic plate. Damper arrangement 60 comprises a permanent magnet 62 having a pair of pole faces, one of which is designated by indicia 64, and a piece 66, to provide a magnetic return path, all of which are secured to a pivot arm 68 which may be affixed to device 10 at its lower end 70 by a flexure pivot, such as pivot 40 of FIGS. 2 and 3, or other spring bias means. The poles of magnets 62 and piece 66 are placed on either side of a plate 72 which is rigidly secured to a device or vehicle by means of an arm 74. Movement of magnet 62 and piece 66 with respect to plate 72 produces eddy currents therein.

Figure 5:
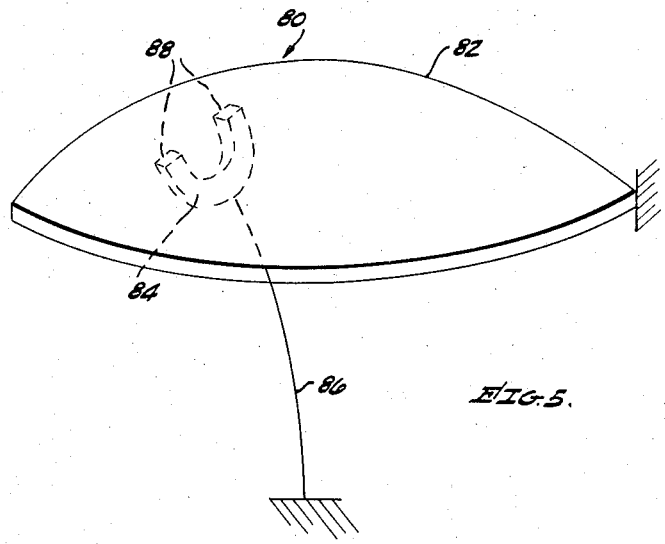
FIG. 5 is a view of a third embodiment of the present invention configured as a two axis device.

While the foregoing embodiments of the damper of FIGS. 2–4 depict a damper with a single degree of movement, FIG. 5 illustrates an embodiment 80 which has two degrees of motion. Damper embodiment 80 comprises a bowl-shaped plate 82 which is capable of carrying an electric current. Plate 82 is secured to a device or vehicle. A permanent magnet 84 is pivotably secured to the device or vehicle by a flexible wire 86 and is so constrained that the magnet poles 88 follow the curvature of the bowl shaped plate. If desired, instead of utilizing a flexible arm 86, a pair of spring bias means, such as that depicted in FIGS. 2 and 3, placed orthogonally with respect to each other, may be utilized in order to provide the desired pivotable movement of magnet 84 with respect to the plate.

Figure 6:
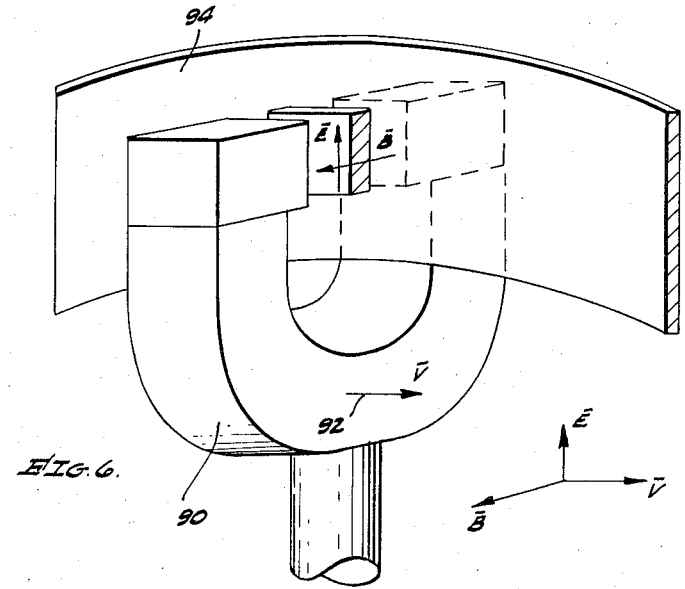
FIG. 6 is a partial view of the magnet and plate of the present invention of the embodiment depicted in FIG. 2 illustrating the eddy current damping operation thereof.

Production of eddy currents and damping thereby is explained in accordance with Lenz's Law with reference to FIG. 6 in the case of a single degree of motion damper, such as that depicted in FIGS. 2 and 3; however, this explanation is as applicable to the embodiment of FIG. 5. In this description, a magnet 90 is assumed to be moving in the direction of arrow 92 with respect to a stationary plate 94 at a given velocity as represented by the velocity vector $\overline{V}$. Since the magnet has a directed magnetic induction given by vector quantity $\overline{B}$, as the magnet moves with respect to the plate, the interaction of the magnetic field with the plate produces an electric field strength $\overline{E}$, as given by the vector cross product $\overline{B} \times \overline{V} + \overline{E}$. A current flow is thereby induced in plate 94 which is proportional to the resistance thereof, that is, $\overline{I} = \overline{E}/R$, where R is the resistance of plate 94. A force $\overline{F}$ is generated by the interaction of the magnetic field of the permanent magnet with the induced current and is in the direction opposite to the velocity vector $\overline{V}$. In other words, the reactive force $\overline{F}$ is the result of the vector cross product to the current with the permanent magnetic field and is the force vector whose direction is opposite to that of the velocity vector of the permanent magnet. Thus, the reactive force is proportional to the velocity and is a damping force.

Figure 7:
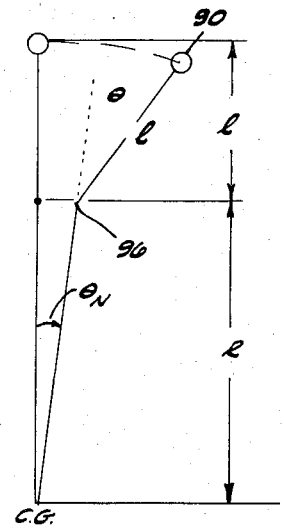
FIG. 7 is a schematic representation of the damper and its mounting position on a vehicle.

Movement of the permanent magnet occurs when the device or vehicle nutates, as representatively shown in FIGS. 1 and 7, the nutation occurring at any one instant at an angle $\theta_N$. This movement through angle $\theta_N$ creates a dynamic excitation which causes magnet 20 or 90 to pivot about its pivot point 96 at an additional angle $\theta$. This movement of the magnet through angle $\theta$ is at the velocity vector quantity $\overline{V}$, referred to above, and induces the damping reactive force operating in the direction opposite to movement of the magnet. Because the device or vehicle has a certain mass, it produces a particular momentum H (see FIG. 1) during nutation which momentum is determined by the following equation: $\overline{H} = \overline{I_s \omega_s} + \overline{I_p \Omega_p} + \overline{I_T \omega_T}$, where $I_s$ and $I_p$ are the spin moments of inertia respectively of spinner 12 and platform 14. The momentum is generally not exactly correlated to the particular mass of magnet 90 and the reactive force created thereby. By placing a spring restraint upon the magnet, correlation between nutation and the reactive force, taken with the mass of the magnet, can be caused to closely coincide. Tuning is achieved by selecting a spring whose rate provides a pendulous frequency of the magnet and the pivot arm equal to or neighboring the frequency at which the vehicle nutates.

Although the invention has been described with reference to particular embodiments thereof, it should be realized that various changes and modifications may be made therein without departing from the spirit and scope of the invention.

What is claimed is:

1. In a spin stabilized vehicle having a known band of nutational frequencies, an eddy current nutation damper despun from said vehicle comprising:
   a plate of nonmagnetic material having high electrical conductivity, said plate being secured to said vehicle and having an arced configuration;
   a permanent magnet positioned at a location distanced from the center of gravity of said vehicle and having a pair of poles positioned on opposite sides of said plate in close proximity therewith;
   a pivot arm secured to said magnet; and
   a pivot having spring bias means secured to said pivot arm and to said vehicle to permit oscillation of said magnet with respect to said plate in an arc conforming to the arced configuration of said plate, said pivot spring bias means exerting a restoring force upon said magnet and said pivot arm having a spring rate tuning the mass of said magnet to a frequency residing within the known band of nutational frequencies of said vehicle.

2. An eddy current nutation damper as in claim 1 wherein the location of said magnet is at the farthest possible location from the vehicle center of gravity.

3. An eddy current nutation damper for a spinning device nutatable at a known frequency about the nutation axis of said device comprising:
   a magnet having a mass positioned on and moveable with respect to said device at a despun position distanced from the center of gravity of said device;
   a member positioned adjacent said magnet and secured to said device, said member capable of carrying an electric current generated in response to movement of said magnet relative to said member to produce a force whose vector is a direction opposite to the velocity vector of said magnet and, consequently, to damp nutations of said device; and
   resilient means having a spring rate secured between said magnet and said device and biasable in response to movement of said magnet to provide restoring forces on said magnet in response to the movement thereof, the mass of said magnet and the magnitude of the spring rate of said resilient means being tuned to the frequency of nutation of said device.

4. A damper as in claim 3 wherein said resilient means comprises a flexture pivot connected between said magnet and said device.

5. A damper as in claim 3 wherein said member is formed of a material having the ability to support generation of eddy current.

6. A damper as in claim 3 wherein said magnet comprises a permanent magnet.

7. A damper as in claim 3 wherein said member comprises an arced plate and said magnet includes a pair of poles closely positioned to said plate on opposite sides thereof, said magnet being constrained to move in the arc of said plate.

8. A damper as in claim 3 wherein said member comprises a bowl-shaped plate having a three-dimensional curvature and said magnet includes a pair of poles closely positioned to said plate, and means secured to said magnet to constrain movement thereof according to the curvature of said plate.

9. A damper as in claim 8 wherein said resilient means includes a flexible pivot arm.

10. A damper as in claim 8 wherein said resilient means includes a pair of orthogonally connected flexure pivots.

11. A damper as in claim 3 wherein said magnet is positioned on one side of said member and further including a piece of magnetic material positioned on the other side of said member and magnetically cooperable with said magnet.

12. A stabilized device comprising:
    a body;
    a sensibly nonrigid gyroscopic mass coupled to said body to spin about a spin axis, and having a spin moment of inertia about said spin axis which is less than the moment of inertia of said device about another axis;
    said body being despun relative to said gyroscopic mass; and mechanical energy-dissipating means coupled to said body, said mechanical means comprising
a member having the ability to support generation of eddy currents, said member secured to said body,
a magnet having a mass positioned on said body and adjacent said member, said magnet being positioned at a distance from the center of gravity of said device and moveable with respect to said device in response to nutation thereof and with respect to said member to produce eddy currents therein, and
resilient means having a spring rate secured between said magnet and said body, said resilient means being biasable in response to movement of said magnet to provide restoring forces thereon in response to the movement thereof, the mass of said magnet and the magnitude of the resilient means spring rate being correlated to tune said energy-dissipating means to the frequencies of nutation of said device.

* * * * *